… … …

United States Patent Office 3,828,001
Patented Aug. 6, 1974

3,828,001
THIOPHENE DERIVATIVES
David Rex Broad, Chelmsford, Leslie Roy Hatton, Ilford, and Edgar William Parnell, Romford, England, assignors to May & Baker Limited, Dagenham, Essex, England
No Drawing. Filed Aug. 13, 1970, Ser. No. 63,604
Claims priority, application Great Britain, Aug. 14, 1969, 40,712/69
Int. Cl. C07d 63/16
U.S. Cl. 260—332.2 C    20 Claims

ABSTRACT OF THE DISCLOSURE

Thiophene derivatives with a grouping —$COOR_1$ in the 2- or 3-position and a ureido grouping —NHCONH—$R_2$ in the 3- or 2-position, $R_1$ representing an alkyl or alkenyl group containing at most 10 carbon atoms or a cycloalkyl group of 5 or 6 carbon atoms, and $R_2$ representing an alkyl or alkenyl group containing at most 6 carbon atoms, or a cycloalkyl group of 3, 4 or 5 carbon atoms, unsubstituted in the 4- and 5-positions or substituted in the 4-position by a methyl or ethyl group, have been found to possess useful herbicidal activity against weeds.

---

This invention relates to new thiophene derivatives which are of use as herbicides.

According to the present invention, there are provided the new thiophene derivatives of the general formula:

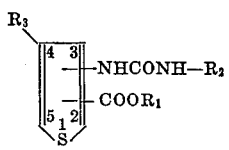

I wherein $R_1$ represents a straight- or branched-chain alkyl or alkenyl group containing at most 10, and preferably not more than 6, carbon atoms or a cycloalkyl group of 5 or 6 carbon atoms, $R_2$ represents a straight- or branched-chain alkyl or alkenyl group containing at most 6 carbon atoms, or a cycloalkyl group of 3, 4 or 5 carbon atoms, and $R_3$ represents a methyl or ethyl group, or as is preferred, a hydrogen atom.

In this specification and the accompanying claims, it is to be understood that either of the substituents drawn on the right hand side of the thiophene ring occupies position 2 of the ring and the other occupies position 3 of the ring.

As a result of research and experimentation, it has been found that the compounds of general formula I possess useful herbicidal activity. According to a feature of the present invention, at least one of the compounds of general formula I is used to control the growth of weeds (i.e. undesired vegetation). For this purpose, they are normally used in the form of herbicidal compositions (i.e. in association with compatible diluents or carriers suitable for use in herbicidal compositions), for example as hereinafter described.

The compounds of general formula I show herbicidal activity against dicotyledonous (i.e. broad-leafed) and monocotyledonous (e.g. grass) weeds on both post-emergence and pre-emergence application. By the term "post-emergence application" is meant application to the aerial or exposed parts of the emerged weeds or to the soil in which they are growing. By the term "pre-emergence application" is meant application to the soil in which the weed seeds or seedlings are present, before the emergence of the weeds above the surface of the soil. For example, the compounds of general formula I may be used to control the growth of weeds such as Chenopodium spp. e.g. Chenopodium album, Polygonum spp., e.g. Polygonum lapathifolium, Polygonum convolvulus, Polygonum aviculare, Brassica spp., e.g. Sinapis arvensis, Matricaria inodora, Stellaria media, Setaria spp., e.g. Setaria viridis, Echinochloa spp., e.g. Echinochloa crusgalli, Poa spp. e.g. Poa annua, Alopecurus myosuroides and Avena fatua.

The amounts of compounds of general formula I applied vary with the nature of the weeds, the compositions used, the time of application and (when used to control the growth of weeds in crop-growing areas) the nature of the crops. In general, taking these factors into account, application rates between ¼ lb. and 4 lbs. of active material per acre give good results, particularly with the preferred compounds mentioned hereafter. However, it must be understood that higher or lower application rates may be used, depending upon the particular problem of weed control encountered.

The compounds of general formula I may be used to control the growth of weeds for example those species hereinbefore mentioned, particularly small-seeded grasses, for example Poa annua and Alopecurus myosuroides, by application to a locus of weed infestation which may be an area used for growing crops such as potatoes, sugar cane, wheat, barley, maize, soya beans, peas, groundnuts, flax, cotton, oil-seed rape, kale and onions.

The compounds of general formula I may also be used to control the growth of weeds in established orchards, vineyards, plantations, e.g. sugar cane plantations and shrubberies (including areas used for growing fruit-bearing bushes such as blackcurrants and redcurrants) for which purpose they are applied preferably in a directional fashion (e.g. by directional spraying) to the weeds or to the soil in which they are expected to appear, avoiding application to the arborescent plants. When used for such purposes in which a total herbicidal effect is frequently desired, the active compounds are normally applied at dosage rates higher than those used in crop-growing areas. The precise dosage will depend upon the nature of the vegetation treated and the effect sought.

The compounds of general formula I are particularly useful (a) in the control by post-emergence application of broad-leafed weeds, for example Chenopodium spp., e.g. Chenopodium album, Polygonum spp., e.g. Polygonum lapathifolium, Polygonum convolvulus and Polygonum aviculare, Brassica spp., e.g. Sinapis arvensis, Matricaria inodora, Stellaria media, Setaria spp. e.g.Setaria viridis and Echinoloa spp. e.g. Eschinochloa crusgalli, and more particularly advanced growth-stages of Stellaria media, and of small-seeded grasses, for example Poa annua and Alopecursus myosuroides, in emerged crops of wheat, barley, maize, peas, flax and oil-seed rape, and (b) in the control by pre-emergence application of broad-leafed weeds, for example those species mentioned above in (a) in pre-emergent crops of maize, peas, beans, flax, wheat and barley. In addition, the compounds 1-(3-n-propoxycarbonylthien-2-yl)-3-methylurea, 1-(2-methoxycarbonylthien-3-yl)-3-methylurea and 1-(2-ethoxycarbonylthien-3-yl)-3-methylurea are particularly useful in the control by pre-emergence application of small-seed grasses, for example Poa annua and Alopecurus myosuroides, in pre-emergent crops of maize, peas, soya beans, ground nuts, flax, wheat and barley.

The preferred compounds of formula I for the control of weeds are compounds of formula I wherein $R_1$ represents a straight- or branched-chain alkyl group of 1 to 4 carbon atoms, $R_2$ represents a straight- or branched-chain alkyl group of 1 to 5 carbon atoms, or an allyl group, or a cyclopropyl group, and $R_3$ represents a hydrogen atom or a methyl group. Compounds of particular value are:

1-(3-ethoxycarbonylthien-2-yl)-3-methylurea,
1-(3-n-propoxycarbonylthien-2-yl)-3-methylurea
1-(3-methoxycarbonylthien-2-yl)-3-ethylurea,
1-(3-methoxycarbonylthien-2-yl)-3-*tert*-butylurea,
1-(3-methoxycarbonylthien-2-yl)-3-allylurea,
1-(3-methoxycarbonylthien-2-yl)-3-cyclopropylurea,
1-(3-methoxycarbonylthien-2-yl)-3-isopropylurea,
1-(3-methoxycarbonylthien-2-yl)-3-n-propylurea,
1-(2-methoxycarbonylthien-3-yl)-3-isopropylurea,
1-(2-isopropoxycarbonylthien-3-yl)-3-methylurea,
1-(2-methoxycarbonylthien-3-yl)-3-ethylurea and
1-(2-methoxycarbonylthien-3-yl-3-n-propylurea, and more especially:

1-(3-methoxycarbonylthien-2-yl)-3-methylurea,
1-(3-ethoxycarbonylthien-2-yl)-3-ethylurea,
1-(2-methoxycarbonylthien-3-yl)-3-methylurea and
1-(2-ethoxycarbonylthien-3-yl)-3-methylurea.

According to features of the present invention, the compounds of general formula I are prepared by the following methods:

(a) The reaction of compounds of the general formula:

$$R_2NCO \qquad (II)$$

(wherein $R_2$ is as hereinbefore defined) with compounds of the general formula:

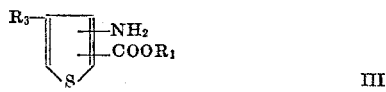

III (wherein $R_1$ and $R_3$ are as hereinbefore defined) in a polar organic solvent inert to the reagents (preferably pyridine), preferably at an elevated temperature (e.g. 50–100° C.).

Compounds of formula III may be prepared by the application of known methods, such as those described by Gewald, Boettcher and Schinke, Chem. Ber., 98, 3571 (1965) by the reaction of a mercaptoaldehyde or mercaptoketone with an alkyl ester of cyanoacetic acid in the presence of a suitable basic organic catalyst (e.g. piperidine) in solution in a suitable organic solvent, for example an alkanol containing at most 4 carbon atoms (e.g. methanol) at a temperature between 40° and 100° C., and in the Specification of British Pat. No. 837086 (granted to Farbwerke Hoechst Akt. on an application filed Aug. 29, 1958), by reaction of a dihalopropionitrile with an ester of thioglycollic acid, in the presence of a basic condensing agent (e.g. sodium methoxide) at a temperature of 10–15° C., or alternatively, where the amino substituent is in the 3-position of the thiophene ring and the other substituent is in the 2-position of the ring, by the acid-catalysed dehydration of ketoximes of the general formula:

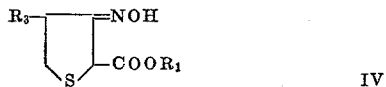

IV (wherein $R_1$ and $R_3$ are as hereinbefore defined) by the action of a strong acid in solution in a dry inert organic solvent, preferably a dry ether, e.g. hydrogen chloride in dry diethyl ether.

Compounds of formula IV may be prepared by known methods, e.g. treatment with hydroxylamine, from compounds of the general formula:

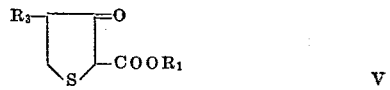

V (wherein $R_1$ and $R_3$ are as hereinbefore defined), which may themselves be prepared by the methods described by Eastman and Woodward, J.A.C.S., 68, 2229, (1946), for example by reaction of an alkyl thioglycollate with an alkyl acrylate in the presence of an organic base (e.g. piperidine) and treatment of the 1,2'-dialkoxycarbonyl ethyl methyl sulphide obtained with a basic catalyst, for example sodium methoxide in a suitable solvent, for example a dry ether (e.g. diethyl ether), at a tempertaure of 10–15° C.

(b) The reaction of compounds of the general formula:

$$R_2NH_2 \qquad VI$$

(wherein $R_2$ is as hereinbefore defined) with compounds of the general formula:

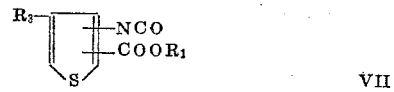

VII or

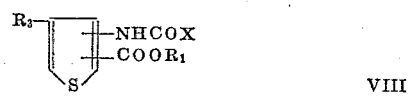

VIII (wherein $R_1$ and $R_3$ are as hereinbefore defined and X represents a chlorine or bromine atom) in an inert organic solvent, for example an aromatic hydrocarbon (e.g. toluene), or a halogenated aliphatic hydrocarbon (e.g. chloroform). Where the starting material is of formula VII, the reaction is preferably carried out at or near ambient temperature; and where the starting material is of formula VIII, the reaction is preferably carried out at 10–90° C., and in the presence of an acid-binding agent, which may be in the form of an excess of the amine reactant of formula VI.

Compounds of formula VIII may be prepared by the reaction between compounds of the general formula:

$$COX_2 \qquad IX$$

(wherein X is as hereinbefore defined) and compounds of formula III in an inert solvent, for example an aromatic hydrocarbon (e.g. toluene), and optionally in the presence of an acid-binding agent, e.g. triethylamine.

Compounds of formula VII may be prepared by heating compounds of formula VIII to 80–100° C., preferably in an inert solvent, for example an aromatic hydrocarbon (e.g. toluene), and in an inert atmosphere (e.g. nitrogen).

(c) The reaction of compounds of formula VI with compounds of the general formula:

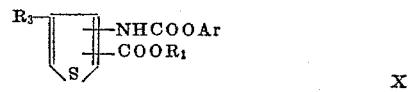

X (wherein $R_1$ and $R_3$ are as hereinbefore defined, and Ar represents an aryl group, preferably phenyl) at an elevated temperature (e.g. 50–100° C.) and in a suitable solvent, for example an alkanol containing at most 4 carbon atoms (e.g. methanol) or an aromatic hydrocarbon, e.g. benzene.

Compounds of formula X may be prepared from compounds of formula III by reaction with a large excess of a compound, or compounds, of the general formula:

$$X—COOAr \qquad XI$$

(wherein Ar and X are as hereinbefore defined) in a suitable inert solvent, for example a ketone (e.g. acetone), in the presence of an acid-binding agent (e.g. sodium carbonate), or alternatively by the reaction of compounds of the general formula:

$$Ar—OH \qquad XII$$

(wherein Ar is as hereinbefore defined) with compounds of formula VII or VIII, preferably at an elevated temperature (e.g. 50–100° C.) in an inert solvent, for example an aromatic hydrocarbon (e.g. toluene).

(d) The reaction of compounds of the general formula:

(wherein $R_2$ and X are as hereinbefore defined) with compounds of formula III in the presence of an acid-binding agent (e.g. sodium carbonate), if necessary at an elevated temperature (e.g. 150° C.) and optionally in the presence of an inert high boiling organic solvent, e.g. toluene.

By the term "known methods" as used in this specification is meant methods which have previously been used or described in the literature.

The following Examples illustrate the preparation of the new thiophene derivatives of the present invention.

EXAMPLE 1

2-Amino-3-methoxycarbonylthiophene (80 g.) was dissolved in dry pyridine (200 ml.), treated with methyl isocyanate (35 ml.), and heated to 80° C. for 6 hours. The solution was then poured into excess ice-cold 2N hydrochloric acid, whereupon a brown solid was precipitated, which was recrystallised from benzene to give 1-(3-methoxycarbonylthien-2-yl)-3-methylurea (50 g.), m.p. 164–166° C.

The following compounds were prepared in a similar manner:

1-(3-ethoxycarbonylthien-2-yl)-3-methylurea, m.p. 134–135° C.;

1 - (3 - n-propoxycarbonylthien-2-yl)-3-methylurea, m.p. 138–140° C.;

1 - ( 3-isopropoxycarbonylthien-2-yl)-3-methylurea, m.p. 169–170° C.;

1 - (3 - n-butoxycarbonylthien-2-yl)-3-methylurea, m.p. 122–124° C.;

1 - (3 - methoxycarbonyl - 4-methylthien-2-yl)-3-methylurea, m.p. 168–170° C.;

1 - (3 - cyclohexyloxycarbonylthien-2-yl)-3-methylurea, m.p. 143–144° C., and

1 - (3 - n-amyloxycarbonylthien-2-yl)-3-methylurea, m.p. 123–125° C.

The following compounds were prepared in a similar manner but replacing the methyl isocyanate by ethyl isocyanate, isopropyl isocyanate and n-butyl isocyanate as appropriate:

1 - (3 - ethoxycarbonylthien-2-yl)-3-ethylurea, m.p. 104–106° C.;

1-(3-methoxycarbonylthien-2-yl)-2-ethylurea, m.p. 155–156° C.;

1 - (3 - methoxycarbonylthien-2-yl)-3-isopropylurea, m.p. 171–172° C., and

1 - (3 - methoxycarbonylthien-2-yl)-3-n-butylurea, m.p. 138.5–140° C.

The preparation of 2-amino-3-methoxycarbonylthiophene, used as a starting-material in the above preparation, has been described by Gewald, Chem. Ber., 98, 3571 (1965) by reaction of mercaptoacetaldehyde (in the form of its dimer) with methyl cyanoacetate in the presence of piperidine in methanol at 50° C., and the following compounds were prepared in a similar fashion from the appropriate starting-materials:

2-amino-3-ethoxycarbonylthiophene, m.p. 46–48° C.;

2 - amino - 3-n-propoxycarbonylthiophene, b.p. 105–120° C./0.2 mm. Hg;

2-amino-3-isopropoxycarbonylthiophene, m.p. 84–88° C.;

2-amino-3-n-butoxycarbonylthiophene, b.p. 122–124° C./0.1 mm. Hg;

2 - amino - 3-methoxycarbonyl-4-methylthiophene, m.p. 111–113° C.;

2-amino-3-cyclohexyloxycarbonylthiophene, m.p. 89–90° C., and

2 - amino - 3-n-amyloxycarbonylthiophene, b.p. 100–125° C./0.1–0.2 mm. Hg.

EXAMPLE 2

3-Methoxycarbonylthien-2-yl isocyanate (5.1 g.) was dissolved in toluene (100 ml.) and monomethylamine gas was introduced into the stirred solution for 15 minutes. The warm solution was then filtered, diluted with petroleum ether (b.p. 60–80° C.) and allowed to cool, whereupon 1-(3-methoxycarbonylthien-2-yl)-3-methylurea (3.6 g.), m.p. 160–163° C., separated as pale yellow crystals.

The following compounds were prepared in a similar manner:

1-(3-methoxycarbonylthien-2-yl)-3-n-propylurea, m.p. 156–158° C.;

1-(3-methoxycarbonylthien-2-yl)-3-*tert*-butylurea, m.p. 158–159° C.;

1-(3-methoxycarbonylthien-2-yl)-3-allylurea, m.p. 125–126° C., and 1-(3-methoxycarbonylthien-2-yl)-3-cyclopropylurea, m.p. 158–160° C.

The 3-methoxycarbonylthien-2-yl isocyanato used as starting material in the above preparation was prepared in the following manner:

2-Amino-3-methoxycarbonylthiophene (22 g.) was dissolved in dry toluene (450 ml.) and the stirred solution treated with liquid phosgene (15 ml.) while maintaining the temperature at −5 to 0° C. Stirring at this temperature was continued for 30 minutes and then the solution was allowed to attain room temperature. The solution was then heated in a stream of nitrogen on a steam bath for 18 hours until evolution of hydrogen chloride had ceased. The resultant solution of 3-methoxycarbonylthien-2-yl isocyanate in toluene was diluted with dry toluene to 500 ml. volume and used without further treatment for subsequent operations.

EXAMPLE 3

Phenyl N-(3-methoxycarbonylthien-2-yl)carbamate (2.0 g.) was dissolved in methanol (50 ml.) at the reflux temperature and the solution heated to reflux for a further 30 minutes while a stream of monomethylamine gas was introduced. The reaction mixture was then cooled and diluted with water (50 ml.), when 1-(3-methoxycarbonylthien-2-yl)-3-methylurea (0.5 g.), m.p. 162–164° C., was precipitated as a colourless solid.

The phenyl N-(3-methoxycarbonylthien-2-yl)-carbamate used as starting material in the above preparation was prepared in the following manner:

3-Methoxycarbonylthien-2-yl isocyanate (10 g.) was dissolved in toluene (50 ml.), treated with phenol (6.0 g.) and the mixture heated to reflux for 2 hours. The solution was then cooled to room temperature, shaken with powdered sodium hydroxide, filtered and the solvent removed *in vacuo* to leave a semi-solid residue. This residue was extracted with hot benzene, the benzene solution evaporated to dryness and the residue recrystallised from petroleum ether (b.p. 80–100° C.) to give phenyl N-(3-methoxycarbonylthien-2-yl)carbamate (2.7 g.), m.p. 126–127° C., as colourless needles.

EXAMPLE 4

2-Methoxycarbonyl-3-aminothiophene (79 g.) was dissolved in dry pyridine (150 ml.) treated with methyl isocyanate (30 ml.) and heated to 70° C. for 3 hours. The solution was then poured into excess ice-cold 2N hydrochloric acid, whereupon an off-white solid was precipitated, which was recrystallised from benzene to give 1-(2-methoxycarbonylthien-3-yl)-3-methylurea (61 g.), m.p. 145–146° C., as colourless needles.

The following compounds were prepared in a similar manner:

1-(2-ethoxycarbonylthien-3-yl)-3-methylurea, m.p. 129–130° C.;

1-(2-isopropoxycarbonylthien-3-yl)-3-methylurea, m.p. 147–148° C.;

1-(2-n-butoxycarbonylthien-3-yl)-3-methylurea, m.p. 122–123° C.;

1-(2-methoxycarbonylthien-3-yl)-3-ethylurea, m.p. 108–110° C.;

1-(2-methoxycarbonylthien-3-yl)-3-isopropylurea, m.p. 120–121° C., and 1-(2-methoxycarbonylthien-3-yl)-3-n-butylurea, m.p. 76–78° C.

The 2-methoxycarbonyl-3-aminothiophene used as a starting material in the above preparation was prepared by the method described in British Patent Specification Ser. No. 837,086 by reaction of 2,3-dichloropropionitrile with methyl thioglycollate in the presence of sodium methoxide in dry diethyl ether at 10–15° C.

The following compounds were prepared in a similar manner from the appropriate starting materials:

2-ethoxycarbonyl-3-aminothiophene, b.p. 96–98° C./0.2 mm. Hg;

2-isopropoxycarbonyl-3-aminothiophene, b.p. 120–130° C./0.1 mm. Hg, and 2-n-butoxycarbonyl-3-aminothiophene, b.p. 122–132° C./0.1 mm. Hg.

As an alternative method, 2-methoxycarbonyl-3-aminothiophene was prepared in the following manner:

2-Methoxycarbonyltetrahydrothiophene-3-ketoxime (15 g.) was dissolved in dry diethyl ether (100 ml.) and the stirred solution treated with a stream of dry hydrogen chloride gas for 30 minutes. By the end of this period a crude precipitate of 2-methoxycarbonyl-3-aminothiophene hydrochloride had appeared, which was extracted with water (50 ml.) leaving a tarry residue. The aqueous extract was neutralised with aqueous sodium bicarbonate solution and extracted with diethyl ether (2× 100 ml.). The combined ether extracts were treated with charcoal, dried over sodium sulphate and evaporated to dryness. The residue was extracted with hot petroleum ether (b.p. 80–100° C.) and the solution evaporated to dryness to give 2-methoxycarbonyl-3-aminothiophene (0.22 g.), m.p. 45–57° C., as yellow crystals. This material was characterised by acetylation with acetic anhydride in acetic anhydried in acetic acid to give 2-methoxycarbonyl-3-acetamidophene, m.p. 93–95° C., undepressed by admixture with material obtained by acetylation of 2-methoxycarbonyl-3-aminothiophene prepared according to British Patent Specification Ser. No. 837,086.

The 2-methoxycarbonyltetrahydrothiophene-3-ketoxime used as a starting material in the above preparation was prepared in the following manner:

A mixture of 2-methoxycarbonyltetrahydrothiophen-3-one (34.4 g.), hydroxylamine hydrochloride (21.5 g.), barium carbonate (41.0 g.) and methanol (200 ml.) was heated to reflux with stirring for 20 hours. The mixture was then filtered and evaporated to dryness, leaving a semi-solid residue. This residue was extracted with diethyl ether and the ether extract filtered and evaporated to dryness to give 2-methoxycarbonyltetrahydrothiophene-3-ketoxime (15 g.) as a brown oil.

The 2-methoxycarbonyltetrahydrothiophen-3-one used as a starting material in the above preparation was prepared according to the method of Eastman and Woodward, J.A.C.S., *68*, 2229 (1946), by reaction of methyl thioglycollate with methyl acrylate in the presence of piperidine and treatment of the 1,2′-dimethoxycarbonyl ethyl methyl sulphide obtained with sodium methoxide in dry diethyl ether at 10–15° C.

EXAMPLE 5

2-Methoxycarbonylthien-3-yl isocyanate (17.5 g.) was dissolved in toluene (200 ml.) and the stirred solution treated with a stream of monomethylamine gas for 30 minutes, the temperature being maintained at 10° C. The solution was then treated with charcoal, filtered, and the solvent removed *in vacuo* to leave an off-white solid, which was recrystallised from benzene to give 1-(2-methoxycarbonylthien-3-yl)-3-methylurea (10.0 g.), m.p. 141–143° C.

The 2-methoxycarbonylthien-3-yl isocyanate used as a starting material in the above preparation was prepared in the following manner:

2-Methoxycarbonyl-3-aminothiophene (15 g.) was dissolved in toluene (200 ml.) and the stirred solution treated with liquid phosgene (10 ml.), the temperature being maintained at −5 to 0° C. Stirring at this temperature was continued for 30 minutes and the solution was then allowed to attain room temperature. The solution was then heated in a stream of nitrogen on a steam bath until evolution of hydrogen chloride had ceased (18 hours). The resultant solution of 2-methoxycarbonylthien-3-yl isocyanate in toluene was used without further treatment for subsequent operations.

EXAMPLE 6

Phenyl N-(2-methoxycarbonylthien-3-yl)carbamate (5.0 g.) was dissolved in methanol (20 ml.) at the reflux temperature and the solution heated to reflux for a further 30 minutes while a stream of monomethylamine gas was introduced. The solvent was then removed *in vacuo* to leave an oily residue, which after crystallisation from benzene and recrystallisation from a mixture (1:1 by volume) of xylene and petroleum ether (b.p. 100–120° C.) gave 1-(2-methoxycarbonylthien-3-yl)-3-methylurea (1.5 g.), m.p. 139–140° C.

The following compounds were prepared in a similar manner:

1-(2-methoxycarbonylthien-3-yl)-3-n-propylurea, m.p. 105–106° C.;

1-(2-methoxycarbonylthien-3-yl)-3-*tert*-butylurea, m.p. 126–127.5° C.;

1-(2-methoxycarbonylthien-3-yl)-3-pentylurea, m.p. 67–68° C.;

1-(2-methoxycarbonylthien-3-yl)-3-allylurea, m.p. 102–103°C., and 1-(2-methoxycarbonylthien-3-yl)-3-cyclopropylurea, m.p. 157–159° C.

The phenyl N-(2-methoxycarbonylthien-3-yl)carbamate used as a starting material in the above preparation was prepared in the following manner:

A mixture of 2-methoxycarbonyl-3-aminothiophene (100 g.), acetone (450 ml.), phenyl chloroformate (200 ml.) and sodium carbonate (100 g.) was heated to reflux with stirring for 10 hours. The mixture was filtered while still hot to remove inorganic material and the filtrate evaporated to dryness. Recrystallisation of the residue from petroleum ether (b.p. 80–100° C.) gave phenyl N-(2-methoxycarbonylthien-3-yl)carbamate (98 g.), m.p. 118–120° C., as colourless needles.

According to a further feature of the present invention, there are provided compositions suitable for herbicidal use comprising one or more of the thiophene derivatives of general formula I in association with, and preferably homogeneously dispersed in, one or more compatible herbicidally-acceptable diluents or carriers (i.e. diluents or carriers of the type generally accepted in the art as being suitable for use in herbicidal compositions and which are compatible with the compounds of general formula I). The term "homogeneously dispersed" is used to include compositions in which the compounds of general formula I are dissolved in the other components. The term "herbicidal compositions" is used in a broad sense to include not only compositions which are ready for use as herbicides but also concentrates which must be diluted before use. Preferably, the compositions contain from 0.05 to 90% by weight of compounds of general formula I.

The herbicidal compositions may contain both a diluent or carrier and a surface-active (e.g. wetting, dispersing, or emulsifying) agent. Surface-active agents which may be present in the herbicidal compositions of the present invention may be of the ionic or non-ionic types, for example sulphoricinoleates, quaternary ammonium derivatives, products based on condensates of ethylene oxide, such as condensates of ethylene oxide with nonyl- or octyl-phenols, or carboxylic acid esters of anhydrosorbitols which have been rendered soluble by etherification of the free hydroxy groups by condensation with ethylene oxide, alkali and alkaline earth metal salts of sulphuric acid esters and sulphonic acids such as dinonyl- and dioctyl-sodium sulphosuccinates and alkali and alkaline earth metal salts of high molecular weight sulphonic acid derivatives such as sodium and calcium lignosulphonates. Examples of suitable solid diluents or carriers are aluminium silicate, talc, calcined magnesia, kieselguhr, tricalcium phosphate, powdered cork, adsorbent carbon black and clays such as kaolin and bentonite. The solid compositions (which may take the form of dusts, granules or wettable powders) are preferably prepared by grinding the compounds of general formula I with solid diluents or by impregnating the solid diluents or carriers with solutions of the compounds of general formula I in volatile solvents, evaporating the solvents and, if necessary, grinding the products so as to obtain powders. Granular formulations may be prepared by absorbing the compounds of general formula I (dissolved in volatile solvents) onto the solid diluents or carriers in granular form and evaporating the solvents, or by granulating compositions in powder form obtained as described above. Solid herbicidal compositions, particularly wettable powders, may contain wetting or dispersing agents (for example of the types described above), which may also, when solid, serve as diluent or carrier.

Liquid compositions according to the invention may take the form of aqueous, organic or aqueous-organic solutions, suspensions, and emulsions which may incorporate a surface-active agent. Suitable liquid diluents for incorporation in the liquid compositions include water, acetophenone, cyclohexanone, isophorone, toluene, xylene and mineral, animal and vegetable oils (and mixture of these diluents). Surface-active agents, which may be present in the liquid compositions may be ionic or non-ionic (for example of the types described above) and may, when liquid, also serve as diluents or carriers. When desired, liquid compositions of the compounds of general formula I may be used in the form of self-emulsifying concentrates containing the active substances dissolved in the emulsifying agents or in solvents containing emulsifying agents compatible with the active substances, the simple addition of water to such concentrates producing compositions ready for use.

Herbicidal compositions according to the present invention may also contain, if desired, conventional adjuvants such as adhesives, colouring agents and corrosion inhibitors. These adjuvants may also serve as carriers or diluents.

Herbicidal compositions according to the present invention may also comprise the compounds of general formula I in association with, and preferably homogeneously dispersed in, one or more other pesticidally active compounds and, if desired, one or more compatible pesticidally acceptable diluents or carriers, surface-active agents and conventional adjuvants as hereinbefore described. Examples of other pesticidally active compounds which may be included in, or used in conjunction with, the herbicidal compositions of the present invention include herbicides, for example phenoxyalkanoic acids [e.g. 4-(4-chloro-2-methylphenoxy)-butyric acid, 4-(2,4-dichlorophenoxy)butyric acid, 2-(4-chloro - 2 - methylphenoxy)-propionic acid, 2 - (2,4 - dichloro phenoxy) propionic acid, 4 - chloro - 2 - methylphenoxyacetic acid, 2,4-dichlorophenoxyacetic acid and 2,4,5 - trichlorophenoxyacetic acid], benzoic acid derivatives (e.g. 2,3,6-trichlorobenzoic acid, 2-methoxy-3,6-dichlorobenzoic acid and 3-amino-2,5-dichlorobenzoic acid), halogenated aliphatic acids (e.g. trichloroacetic acid and 2,2-dichloropropionic acid), carbamates [e.g. isopropyl N-(3-chlorophenyl)-carbamate, isopropyl N-phenylcarbamate, and 3-chloro-2-butynyl N-(3-chlorophenyl)carbamate], thiocarbamates (e.g. S-2,3,3-trichloroallyl N,N-diisopropylthiocarbamate and S-propyl N,N-dipropylthiocarbamate), amides [e.g. 3,4-dichloro-propionanilide, 2-chloro - N - isopropylacetanilide and D-N-ethyl-2-(phenylcarbamoyloxy)-propionamide], urea derivatives [e.g. N'-(4-chlorophenyl)-N,N-dimethylurea, N,N-dimethyl-N'-phenylurea, N'-(3,4-dichlorophenyl)-N,N - dimethylurea and N' - (4 - chlorophenyl)-N-methoxy - N - methylurea], diazines (e.g. 5-bromo-3-isopropyl-6-methyluracil and 3 - cyclohexyl - 5,6-trimethyleneuracil), triazines (e.g. 2-chloro-4,6-bis-ethylamino-1,3,5-triazine, 2-chloro-4-ethylamino-6 - isopropylamino-1,3,5-triazine and 6-(3 - methoxypropylamino) - 4-isopropylamino-2-methylthio-1,3,5 - triazine), substituted phenols [e.g. 2-methyl-4,6-dinitrophenol, 2 - (1 - methylpropyl)-4,6-dinitrophenol and 2,4- dichlorophenyl 4-nitrophenyl ether], quaternary ammonium derivatives (e.g. 1,1'-ethylene-2,2'-bipyridylium and 1,1'-dimethyl - 4,4'-dipyridylium salts), benzonitrile derivatives (e.g. 2,6-dichlorobenzonitrile and 3,5-diiodo- and 3,5-dibromo-4-hydroxybenzonitriles and their esters e.g. their octanoates), triazole derivatives (e.g. 3-amino-1,2,4-triazole), thiocarbonyl derivatives [e.g. di(methoxythiocarbonyl) disulphide], benzenesulphonylcarbamates (e.g. methyl 4-aminobenzenesulphonylcarbamate, methyl 4-nitrobenzenesulphonylcarbamate and methyl 4-methoxycarbonylaminobenzenesulphonylcarbamate), 4-chloro-2-oxobenzothiazolin-3-ylacetic acid, and 2-tert-butyl-4-(2,4-dichloro-5-isopropoxyphenyl)-5-oxo-1,3,4 - oxodiazole, insecticides, e.g. naphth-1-yl N-methylcarbamate, and fungicides, e.g. 2,6 - dimethyl - 4 - tridecylmorpholine, methyl N - benzimidazol-2-yl-N-(butylcarbamoyl) carbamate and 1,2-bis-(3-methoxycarbonyl - 2 - thioureido)benzene. Other biologically active materials which may be included in, or used in conjunction with, the herbicidal compositions of the present invention are plant growth regulators, e.g. maleic hydrazide, N-dimethylaminosuccinamic acid and 2 - chloroethyl)trimethylammonium chloride, fertilizers containing nitrogen, potassium and phosphorus and trace elements known to be essential to successful plant-life, e.g. iron, magnesium, zinc, manganese, cobalt and copper.

It will be appreciated that the compounds of formula I may also be named as 2- or 3-thenoates; for example, the compound 1-(2-methoxycarbonylthien-3-yl)-3-methylurea may also be named as methyl 3-(3-methylureido)-2-thenoate.

The following Examples illustrate the herbicidal compositions of the present invention. In them the materials identified by Trade Marks or otherwise are as specified hereafter: Texofor F60 is an ethyleneoxide/octylphenol condensate; Celite X 250 is a finely divided aluminum silicate; Belloid TD is the sodium salt of the condensation product of formaldehyde and naphthalene sulphonic acid; Celite PF is a finely divided synthetic magnesium silicate; Ketjensil 201 is a colloidal silica: Ethylan CP is an ethylene oxide/octylphenol condensate; Texofor F X 85 is an ethylene oxide/octylphenol condensate; Pentrone T is an anionic wetting agent of the sulphated alcohol type; Attapulgite granules are granules of attapulgite clay; Arylan CA is calcium dodecylbenzenesulphonate, and Ethylan TU is an ethylene oxide/nonylphenol condensate.

EXAMPLE 7

An emulsifiable concentrate is formed from the following:

Percent w./v.
1-(2-methoxycarbonylthien-3-yl)-3-methylurea ----- 20
Texofor F X 85 ---------------------------------- 10
Xylene to 100% by volume.

This concentrate may be used after dilution with water as a herbicide.

EXAMPLE 8

A wettable powder is formed from the following:

| | Percent w./w. |
|---|---|
| 1-(2-methoxycarbonylthion-3-yl)-3-methylurea | 50 |
| Pentrone T | 10 |
| Celite PF | 40 | by dissolving the thiophene derivative in acetone, spraying this solution on to a mixture of the other ingredients in a ribbon-blender and grinding the resultant powder to a suitable fineness.

EXAMPLE 9

Granules are formed from the following:

| | Percent w./w. |
|---|---|
| 1-(2-methoxycarbonylthien-3-yl)-3-methylurea | 10 |
| Attapulgite granules | 90 | by dissolving the thiophene derivative in acetone and pouring this solution on to the attapulgite granules in a groove-type mixer. The solvent is evaporated immediately the solution is added by maintaining the mixture at about 30° to 40° C. and sweeping the interior of the apparatus with a current of air. The granules are finally dried under reduced pressure at 40°–50° C.

EXAMPLE 10

An emulsifiable concentrate is prepared from the following:

| | Percent w./v. |
|---|---|
| 1-(2-methoxycarbonylthien-3-yl)-3-methylurea | 10 |
| Arylan CA | 5 |
| Ethylan TU | 5 |

Cyclohexanone 3 parts by volume to 100% by volume.
Xylene 1 part by volume to 100% by volume.

by dissolving the urea derivative, the Arylan CA and the Ethylan TU in the mixture of cyclohexanone and xylene. This concentrate may be diluted with water and applied at a rate of 1 lb. of urea derivative in 20 gallons of water per acre to control *Chenopodium album, Polygonum lapathifolium, Polygonum convolvulus, Sinapis arvensis, Matricaria inodora, Stellaria media* and *Poa annua* in crops of peas by application after the crop and weeds have emerged.

EXAMPLE 11

A powder is prepared from the following:

| | Percent w./w. |
|---|---|
| 1-(2-methoxycarbonylthien-3-yl)-3-methylurea | 50 |
| Belloid TD | 5 |
| Celite PF | 45 | by dissolving the urea derivative in acetone, dispersing the solution obtained on the Celite PF and evaporating off the acetone. The Belloid TD is then blended with the solid product. The powder obtained may be dispersed by stirring with water and the suspension obtained applied at a rate of 3 lbs. of urea derivative in 10 gallons of water per acre to control *Echinochloa* spp. and *Setaria* spp. by pre- or post-emergence application in crops of maize before emergence of the crop.

EXAMPLE 12

An emulsifiable concentrate is prepared from the following:

| | Percent w./v. |
|---|---|
| 1-(2-ethoxycarbonylthien-3-yl)-3-methylurea | 10 |
| Arylan CA | 5 |
| Ethylan TU | 5 |

Cyclohexanone 3 parts by volume to 100% by volume.
Xylene 1 part by volume to 100% by volume.

by dissolving the urea derivative, the Arylan CA and the Ethylan TU in the mixture of cyclohexanone and xylene. This concentrate may be diluted with water and applied at a rate of 1 lb. of urea derivative in 20 gallons of water per acre to control *Chenopodium album, Polygonum lapathifolium, Sinapis arvensis, Matricaria inodora, Poa annua, Alopecurus myosuroides* and, more particularly, *Stellaria media* in crops of wheat by application after the crop and weeds have emerged.

EXAMPLE 13

A powder is prepared from the following:

| | Percent w./w. |
|---|---|
| 1-(3-methoxycarbonylthien-2-yl)-3-methylurea | 50 |
| Celite PF | 35 |
| Ketjensil 201 | 7.5 |
| Ethylan CP | 2.5 |
| Belloid TD | 5.0 | by dissolving the urea derivative in methylene chloride, mixing the solution obtained with the Celite PF and the Ketjensil 201 and evaporating off the methylene chloride. The Ethylan CP and the Belloid TD are then blended with the solid product. The powder obtained may be dispersed by stirring with water and the resulting suspension applied at a rate of 1 lb. of urea derivative in 20 gallons of water per acre to control *Chenopodium album, Polygonum lapathifolium, Sinapis arvensis, Matricaria inodora, Stellaria media Alopecurus myosuroides* and *Poa annua* in crops of oil-seed rape by application after the crop and weeds have emerged.

EXAMPLE 14

A powder is prepared from the following:

| | Percent w./w. |
|---|---|
| 1-(3-ethoxycarbonylthien-2-yl)-3-methylurea | 50 |
| Celite PF | 35 |
| Ketjensil 201 | 7.5 |
| Ethylan CP | 2.5 |
| Belloid TD | 5 | by dissolving the urea derivative in methylene chloride, mixing the solution obtained with the Celite PF and the Ketjensil 201 and evaporating off the methylene chloride. The Ethylan CP and the Belloid TP are then blended with the solid product. The powder obtained may be dispersed by stirring with water and the resulting suspension applied at a rate of ½ lb. of urea derivative in 20 gallons of water per acre to control over-wintered plants of *Stellaria media* and *Matricaria inodora* in crops of autumn sown wheat by application the following spring.

EXAMPLE 15

An emulsifiable concentrate is prepared from the following:

| | Percent w./v. |
|---|---|
| 1-(3-ethoxycarbonylthien-2-yl)-3-ethylurea | 10 |
| Arylan CA | 5 |
| Ethylan TU | 5 |

Cyclohexanone 3 parts by volume to 100% by volume.
Xylene 1 part by volume to 100% by volume.

by dissolving the urea derivative, the Arylan CA and the Ethylan TU in the mixtxure of cyclohexanone and xylene. The concentrate may be diluted with water and applied at a rate of 1 lb. of urea derivative in 20 gallons of water per acre to control *Sinapis arvensis, Matricaria inodora, Chenopodium album* and *Stellaria media* in crops of barley by application after the crop and weeds have emerged.

EXAMPLE 16

A powder is prepared from the following:

| | Percent w./w. |
|---|---|
| 1-(3-n-propoxycarbonylthien-2-yl)-3-methylurea | 50 |
| Celite PF | 35 |
| Ketjensil 201 | 7.5 |
| Ethylan CP | 2.5 |
| Belloid TD | 5.0 | by dissolving the urea derivative in methylene chloride, mixing the solution obtained with the Celite PF and the Ketjensil 201 and evaporating off the methylene chloride. The Ethylan CP and the Belloid TP are then blended with the solid product. The powder obtained may be dispersed by stirring with water and the resulting suspension applied at a rate of 2 lbs. of urea derivative in 10 gallons of water per acre to control *Chenopodium* spp., *Polygonum* spp., *Setaria* spp. and *Brassica* spp. in crops of soya beans by pre- or post-emergence application before emergence of the crop.

We claim:

1. A thiophene derivative of the formula:

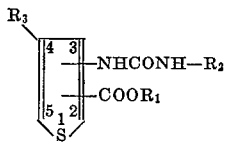

wherein $R_1$ represents alkyl or alkenyl of at most 10 carbon atoms or cycloalkyl of 5 or 6 carbon atoms, $R_2$ represents alkyl or alkenyl of at most 6 carbon atoms, or cycloalkyl of 3, 4 or 5 carbon atoms, and $R_3$ represents methyl, ethyl or hydrogen.

2. A thiophene derivative according to claim 1 wherein $R_3$ represents hydrogen.

3. A thiophene derivative according to claim 1 wherein $R_1$ represents alkyl of 1 through 4 carbon atoms, $R_2$ represents alkyl of 1 through 5 carbon atoms, or allyl or cyclopropyl, and $R_3$ represents hydrogen or methyl.

4. The thiophene derivative according to claim 1 which is 1-(3-methoxycarbonylthien-2-yl)-3-methylurea.

5. The thiophene derivative according to claim 1 which is 1-(3-ethoxycarbonylthien-2-yl)-3-ethylurea.

6. The thiophene derivative according to claim 1 which is 1-(2-methoxycarbonylthien-3-yl)-3-methylurea.

7. The thiophene derivative according to claim 1 which is 1-(2-ethoxycarbonylthien-3-yl)-3-methylurea.

8. The thiophene derivative according to claim 1 which is 1-(3-ethoxycarbonylthien-2-yl)-3-methylurea.

9. The thiophene derivative according to claim 1 which is 1-(3-n-propoxycarbonylthien-2-yl)-3-methylurea.

10. The thiophene derivative according to claim 1 which is 1-(3-methoxycarbonylthien-2-yl)-3-ethylurea.

11. The thiophene derivative according to claim 1 which is 1-(3-methoxycarbonylthien-2-yl)-3-*tert*-butylurea.

12. The theophene derivative according claim 1 which is 1-(3-methoxycarbonylthien-2-yl)-3-allylurea.

13. The thiophene derivative according to claim 1 which is 1-(3-methoxycarbonylthien-2-yl)-3-cyclopropylurea.

14. The thiophene derivative according to claim 1 which is 1-(3-methoxycarbonylthien-2-yl)-3-isopropylurea.

15. The thiophene derivative according to claim 1 which is 1-(3-methoxycarbonylthien-2-yl)-3-n-propylurea.

16. The thiophene derivative according to claim 1 which is 1-(2-methoxycarbonylthien-3-yl)-3-isopropylurea.

17. The thiophene derivative according to claim 1 which is 1-(2-isopropoxycarbonylthien-3-yl)-3-methylurea.

18. The thiophene derivative according to claim 1 which is 1-(2-methoxycarbonylthien-3-yl)-3-ethylurea.

19. The thiophene derivative according to claim 1 which is 1-(2-methoxycarbonylthien-3-yl)-3-n-propylurea.

20. A thiophene derivative of the formula:

wherein $R_1$ represents alkyl of at most 6 carbon atoms, $R_2$ represents alkyl of at most 6 carbon atoms, and $R_3$ represents methyl, ethyl or hydrogen.

References Cited

Capuano et al.: *Chem. Ber.* 1969, 102 (11), 3698–706.

Takaya et al.: *Bull. Chem. Soc. Japan*, Vol. 41, No. 10, 2532–34 (October 1968).

HENRY R. JILES, Primary Examiner

C. M. S. JAISLE, Assistant Examiner

U.S. Cl. X.R.

71—90